United States Patent [19]

Moravnik

[11] Patent Number: 4,550,712
[45] Date of Patent: * Nov. 5, 1985

[54] SOLAR WATER HEATING APPARATUS AND SOLAR CONCENTRATOR USEFUL THEREWITH

[75] Inventor: Zvi Moravnik, Hadera, Israel

[73] Assignee: Solar Power Laboratories, Ltd., Hadera, Israel

[*] Notice: The portion of the term of this patent subsequent to Sep. 18, 2001 has been disclaimed.

[21] Appl. No.: 508,535

[22] Filed: Jun. 28, 1983

Related U.S. Application Data

[63] Continuation-in-part of Ser. No. 395,981, Jul. 7, 1982, Pat. No. 4,471,763.

[30] Foreign Application Priority Data

Jun. 29, 1982 [IL] Israel ............................ 66166

[51] Int. Cl.⁴ .................................................. F24J 3/02
[52] U.S. Cl. ..................................... 126/439; 126/437
[58] Field of Search ............... 126/432, 433, 434, 446, 126/447, 450, 438, 437

[56] References Cited

U.S. PATENT DOCUMENTS

| | | | |
|---|---|---|---|
| 4,003,367 | 1/1977 | Wilkholm | 126/434 |
| 4,033,325 | 7/1977 | Walker | 126/434 |
| 4,083,359 | 4/1978 | Smith | 126/433 |
| 4,083,490 | 4/1978 | Cunningham et al. | 126/437 |
| 4,284,066 | 8/1981 | Brow | 126/435 |
| 4,471,763 | 9/1984 | Moravnik | 126/439 |

*Primary Examiner*—James C. Yeung
*Attorney, Agent, or Firm*—Cushman, Darby & Cushman

[57] ABSTRACT

Solar water heating apparatus comprising a housing, apparatus disposed in the housing for receiving incident solar energy and for heating a first fluid thereby, heat exchanger apparatus disposed in the housing for contacting the heated first fluid and being operative to heat a second fluid; and apparatus for providing circulation of the first fluid through the receiving and heating apparatus and in thermal contact with the heat exchanger apparatus and wherein the first fluid is maintained at atmospheric pressure. A solar energy collector and concentrator useful in the above-described heating apparatus is also described and claimed.

10 Claims, 9 Drawing Figures

SOLAR WATER HEATING APPARATUS AND SOLAR CONCENTRATOR USEFUL THEREWITH

This application is a continuation-in-part of Ser. No. 395,981, filed July 7, 1985, now U.S. Pat. No. 4,471,763.

FIELD OF THE INVENTION

The present invention relates to solar energy utilization apparatus generally and more particularly to a solar energy powered water heater.

BACKGROUND OF THE INVENTION

There is known in the patent literature and on the marketplace a great variety of solar water heaters. Most of the water heaters which have enjoyed wide commercial acceptance comprise a flat plate collector through which water circulates for heating thereof. The heated water is stored in a tank.

Solar energy concentrators are also known. Examples of such concentrators are described in U.S. Pat. Nos. 4,162,824; 4,141,340; 4,069,812; 4,154,219; 4,056,094; 4,045,246; 4,024,852; and 4,003,364 and in German Offenlegungsschrift No. 2,827,708.

SUMMARY OF THE INVENTION

The present invention seeks to provide an improved solar energy concentrating collector which is particularly useful for water heating applications.

There is thus provided in accordance with a preferred embodiment of the present invention non-focusing solar energy concentration apparatus comprising a solar energy absorbing plate defining first and second parallel back-to-back solar energy absorbing surfaces having a low emissivity coating and arranged in communication with fluid flowing adjacent thereto for heat transfer to the fluid, each solar energy absorbing surface having a first surface area;

Solar energy transmissive material disposed adjacent the first and second parallel absorbing surfaces, the solar energy transmissive material defining on respective first and second sides of the plate, first and second incident surfaces arranged to receive incident radiation from the sun, each of the first and second incident surfaces having a surface area which is greater than the first surface area, the solar energy transmissive material also defining first and second adjacent surfaces disposed in spaced adjacent relationship to the first and second parallel absorbing surfaces for transmitting radiation thereto, the separations between the first and second adjacent surfaces and the first and second absorbing surfaces defining a channel for passage of fluid therebetween;

the first and second incident surfaces lying perpendicular to the first and second absorbing surfaces;

the transmissive material having an index of refraction and a configuration selected to provide total internal reflection at the first and second incident surfaces of radiation incident on the incident surfaces within a predetermined azimuthal range;

the plate being surrounded externally along the absorbing surfaces by the transmissive material, thus providing thermal insulation for the plate.

Further in accordance with an embodiment of the present invention, the transmissive material is integrally formed as a single unit defining a central bore in which the plate is located and which defines the fluid channel.

Alternatively in accordance with an embodiment of the invention the transmissive material is formed of two identical halves, each of a generally triangular configuration.

According to a preferred embodiment of the invention, each of the identical halves has an incident surface of width between one and two inches and the plates have absorbing surfaces of less than one inch.

Further in accordance with an embodiment of the invention, the incident radiation includes diffuse radiation.

Additionally in accordance with an embodiment of the present invention, the concentration apparatus also comprises reflectors associated with a surface of the transmissive material for directing radiation towards the absorbing surface.

Further in accordance with an embodiment of the present invention, the incident surface defines at least one surface which is generally transparent to incident solar radiation from the atmosphere and substantially reflective of radiation reflected within the transmissive material.

The present invention also seeks to provide an improved solar water heater, which according to a preferred embodiment, employs a concentrator of the type described hereinabove.

There is thus provided in accordance with a preferred embodiment of the present invention, a solar water heater comprising a housing, apparatus disposed in the housing for receiving incident solar energy and for heating a first fluid thereby, heat exchanger apparatus disposed in the housing and receiving the heated first fluid and being operative to heat a second fluid, and apparatus for providing circulation of the first fluid through the heating and heat exchanger apparatus, and wherein the first fluid is maintained at atmospheric pressure.

Further in accordance with an embodiment of the present invention, the receiving and heating apparatus comprises a solar energy concentrator.

Additionally in accordance with a preferred embodiment of the invention, the heat exchanger apparatus comprises a zigzag arrangement of welded thermally conductive tubes and fins through which passes a pressurized flow of said second fluid.

Further in accordance with an embodiment of the present invention, the housing is integrally formed of an insulating material such as a foamed plastic.

It is a particular feature of the present invention that the second fluid is normally heated as it passes through the heat exchanger and is not stored in a heated state.

It is a further particular feature of the present invention that a highly efficient collector is employed to provide a moderate temperature water heater output, typically 40 degrees centigrade, even under conditions of relatively low incident solar radiation, thus providing a solar water heater which provides usable hot water in required quantities during a great majority of the days of the year.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figures 1, 2:
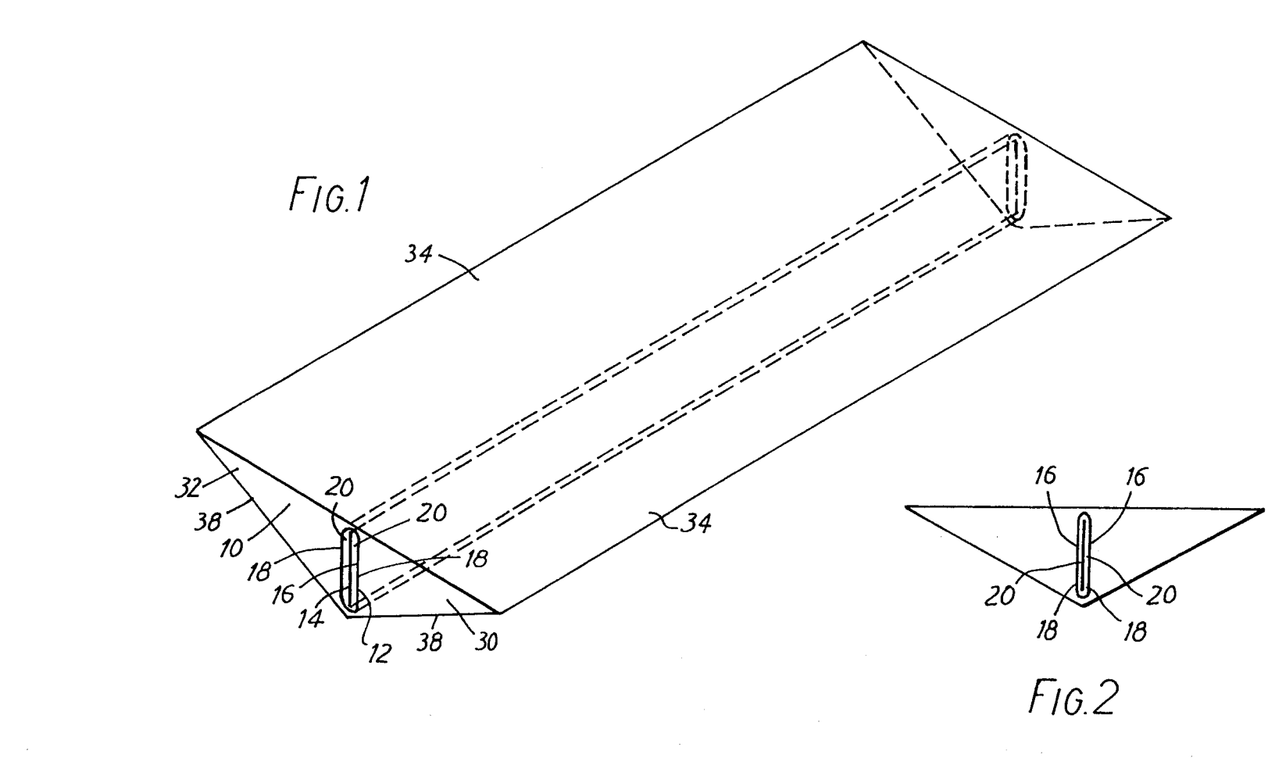
FIG. 1 is a pictorial illustration of a preferred embodiment of solar energy collection and concentration apparatus constructed and operative in accordance with a preferred embodiment of the present invention.
FIG. 2 is an end view illustration of the apparatus of FIG. 1.
Figures 3A, 3B:
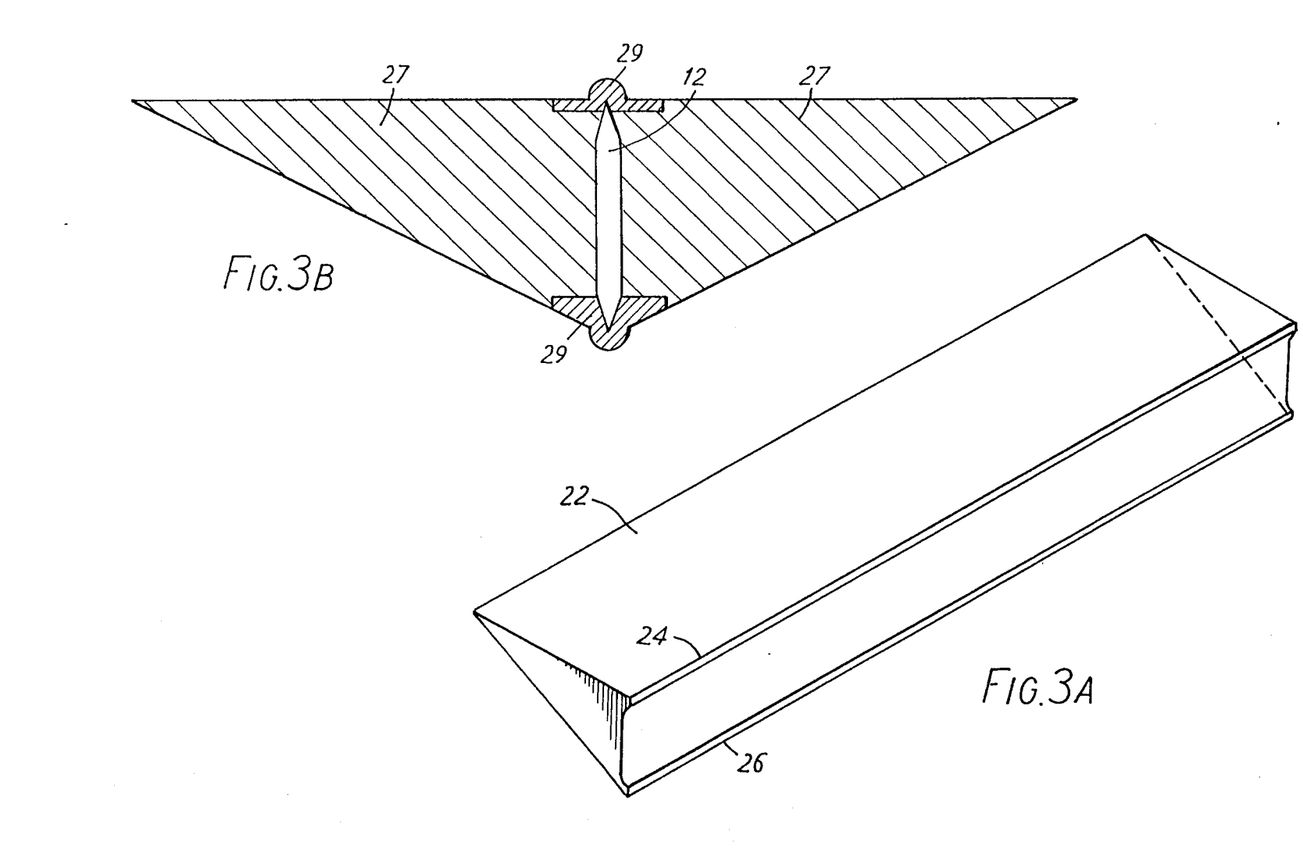
FIGS. 3A and 3B are respectively a pictorial illustration of a modular one-half portion employed in constructing the apparatus of the present invention, illustrated in FIGS. 1 and 2 and an end view of an alternative construction of a solar collection and concentration element.
Figure 4:
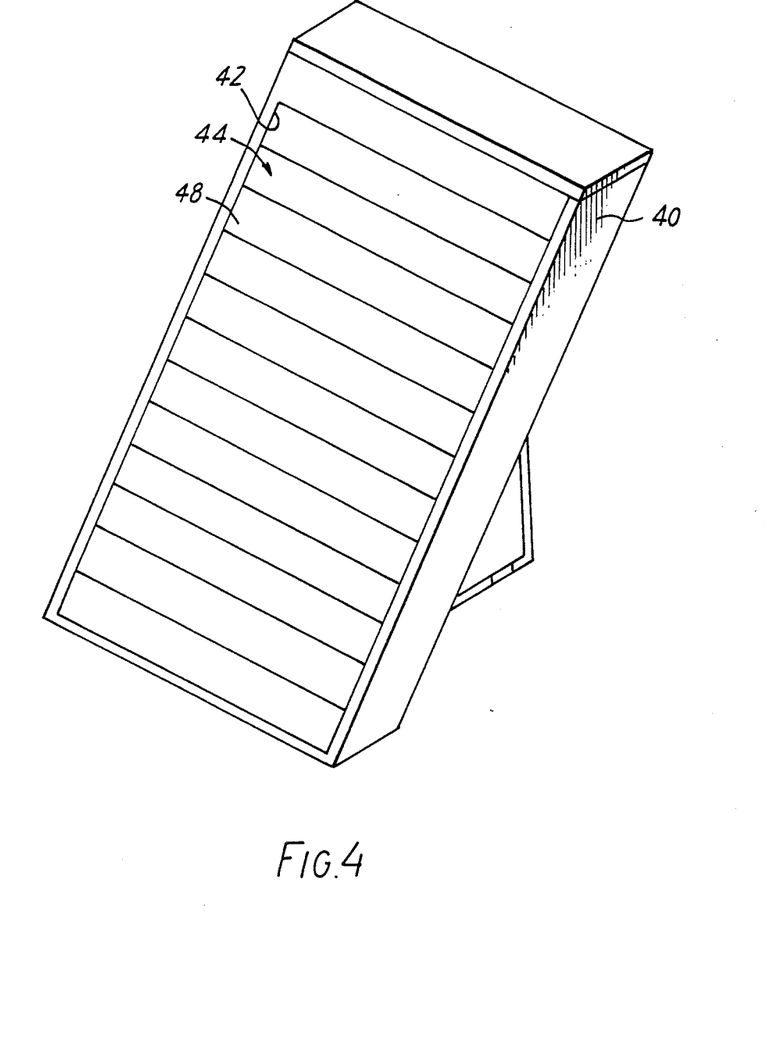
FIG. 4 is a pictorial illustration of a solar water heater constructed and operative in accordance with a preferred embodiment of the present invention.

Reference is now made to FIGS. 1–3 which illustrate a preferred embodiment of the present invention. In the embodiment of FIGS. 1 and 2, there is provided an elongate element 10 of uniform generally triangular cross section. Element 10 typically comprises a material having an index of refraction greater than that of air and is typically formed of glass or of a generally clear plastic such as polycarbonate.

According to one embodiment of the invention, element 10 comprises a unitary integrally formed element which is formed with an elongate bore 12 of generally uniform rounded rectangular cross section. Disposed in bore 12 is a solar energy absorber plate 14, which typically comprises a strip of metal such as copper or of any other suitable material having opposite elongate side surfaces 16, each of which is preferably provided with a solar energy selective coating, providing low emissivity and high adsorptivity. The selective coating may be one of a number of known selective coatings and may comprise, for example, black paint or a nickel oxide coating.

Solar energy absorbing surfaces 16 are normally disposed in spaced relationship to the inner adjacent walls 18 of bore 12, along at least most of the area thereof, with the possible exception of areas adjacent the top and bottom edges of plate 14. The volume thus defined between each of the surfaces 16 and the respective adjacent walls 18 provides a pair of channels 20, which may or may not be in communication with each other, for the passage of heat transfer fluid through bore 12 in thermal communication with surfaces 16. The purpose of the passage of this heat transfer fluid is to receive heat absorbed by surfaces 16 and to transfer it to utilization apparatus, one example of which will be described hereinbelow.

The heat transfer fluid may be any desired fluid and may be, for example, water, oil, or any other suitable fluid. Circulation of the fluid may be produced by thermosyphonic action or by means of a pump or any other suitable driving means.

According to an alternative embodiment of the invention, instead of being formed as a unitary integrally formed element, element 10 may be formed of two half elements 22, each having the configuration illustrated in FIG. 3A. Half elements 22 may be joined at their respective seams 24 and 26 by adhesive, ultrasonic welding or any other suitable bonding means for providing the element 10 shown in FIGS. 1 and 2.

As a further alternative, illustrated in FIG. 3B, elements 10 may comprise generally triangular elements 27 which may be joined by first and second transparent elongate bridge member 29 which define bore 12.

As a further alternative, a plurality of elements 10 may be formed together in an array, such as a sheet like arrangement.

Element 10 defines symmetrical generally triangular total internal reflection elements 30 and 32 each operating with one of the two solar absorbing surfaces 16. Each element 30, 32 defines an incident surface 34 which is arranged to lie perpendicular to surface 16 and to have a surface area greater than the surface area of surface 16. Each element 30 also defines a reflective surface 38, which may be provided by a mirror or by a reflective coating, as necessary.

Typical cross sectional dimensions of the apparatus of FIGS. 1–8 are as follows:

Total width of two incident surfaces—80 mm,

Total maximum thickness at bore 12 from incident surface to junction of reflective surfaces 38—approximately 20 mm.

Total width of absorbing plate 14—approximately 19 mm.

It is a particular feature of the present invention that the solar absorbing plate 14 is substantially surrounded by element 10, thus providing thermal insulation to plate 14.

Reference is now made to FIGS. 4–7 which illustrate a solar water heater constructed and operative in accordance with a preferred embodiment of the present invention. The water heater comprises a housing 40, preferably formed of a foamed plastic material such as foamed polyurethane or alternatively formed of cross linked polyethylene. The housing defines a forward recess 42 in which is disposed a solar concentrator array 44. Solar concentrator array 44 is preferably an array of the general type described hereinabove in connection with FIGS. 1–3B.

Disposed in housing 40 on both ends of array 44 are first and second side manifolds 46 which couple the fluid flow paths in the individual elements 48 of array 44 in parallel for providing a fluid path for a first fluid, such as oil or a water solution, to be heated by the solar concentrator array 44. One of manifolds 46 communicates at the bottom thereof via a water inlet 50 with the bottom region of a reservoir 52 which contains the first fluid under atmospheric pressure. The other one of the manifolds 46, most of which is not seen in FIGS. 5 and 6, communicates at the top thereof via a circulation conduit 54 and a circulation pump 56 with the top region of reservoir 52.

Figures 5, 7:
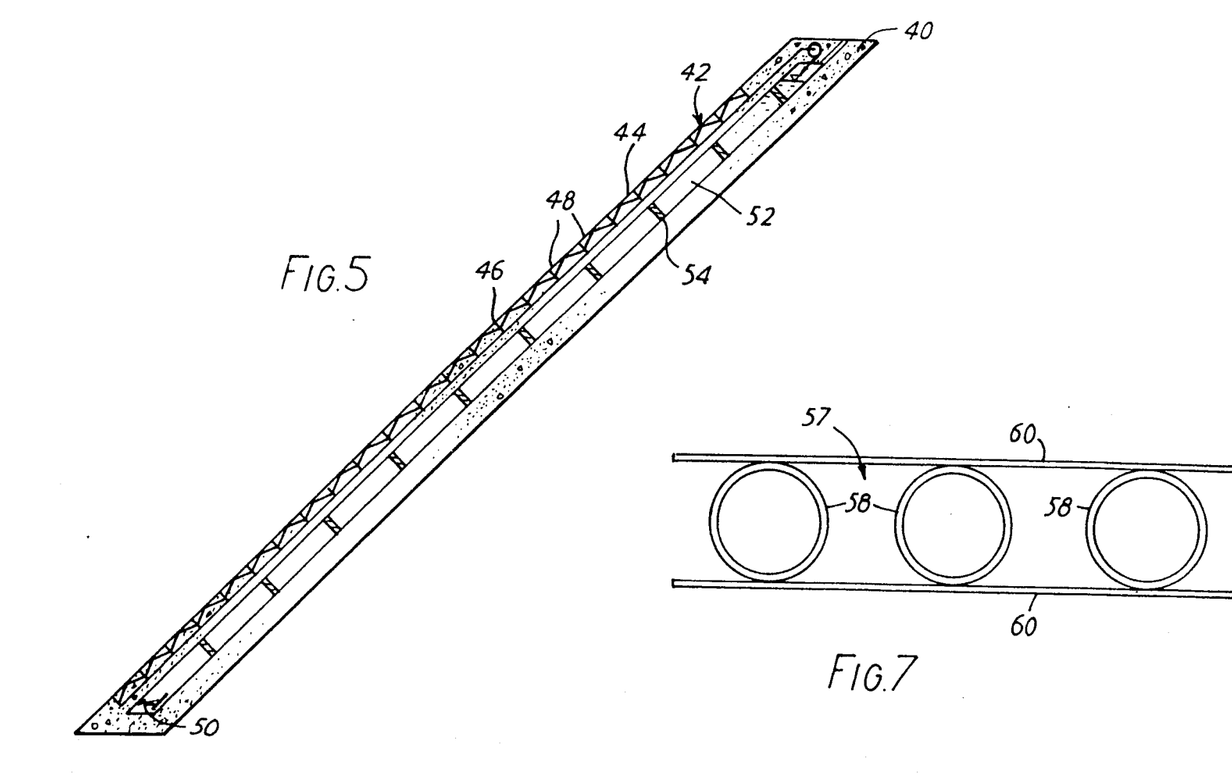
FIG. 5 is a side sectional illustration of the solar water heater of FIG. 4.
FIG. 7 is a sectional illustration of the heat exchanger employed in the apparatus of FIGS. 4–6, taken along the lines VII—VII shown in FIG. 6.

Disposed in reservoir 52 is a heat exchanger 54, through which flows a second fluid to be heated by the first fluid. The second fluid is typically water suitable for domenstic use. Heat exchanger 54 is illustrated clearly in FIGS. 6 and 7 and is seen to comprise a zig-zag series arrangement of a tube and plate assembly 57. As seen in FIG. 7, the tube and plate assembly comprises a plurality of tubes 58, formed of copper or another good conductor, which carry water under conventional pressure, such as 6 Atm., which are joined to heat exchange plates 60 as by ultrasonic welding.

Figure 6:
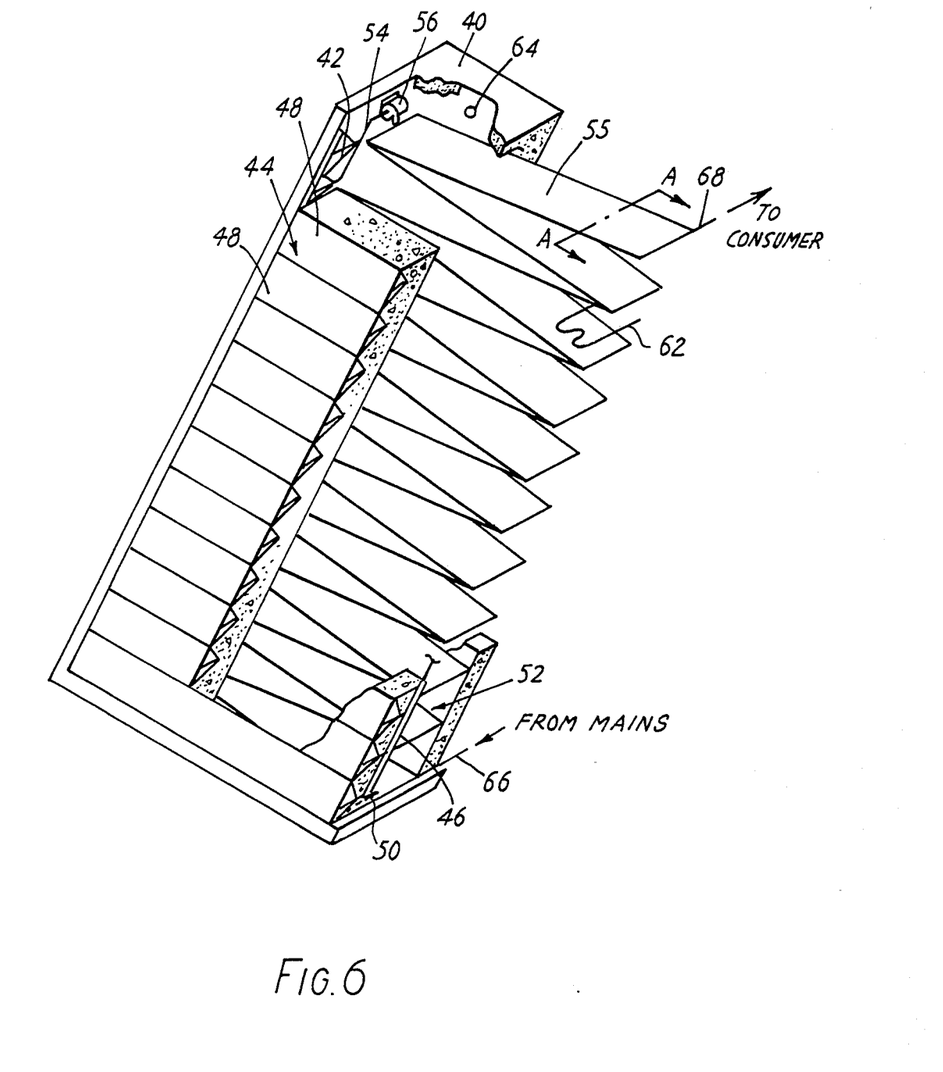
FIG. 6 is a partially cut away pictorial illustration of the solar water heater of FIGS. 4 and 5.
Figure 8:
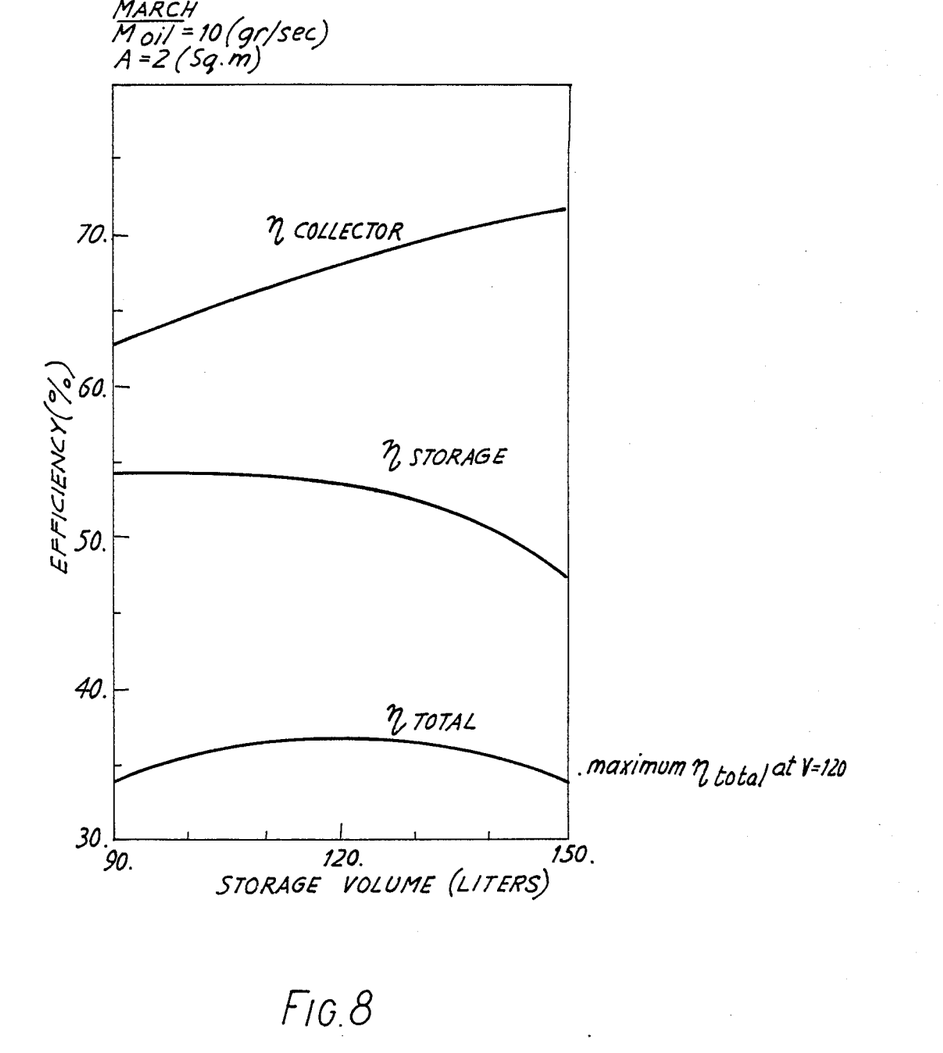
FIG. 8 is a plot of storage volume versus efficiency useful in the design of the apparatus of FIGS. 4–7.

Also disposed in reservoir 52 is an auxiliary electric heating element 62 as well as a thermostat sensor 64 for operation of the heating element 62 when needed.

A second fluid inlet 66 is provided at the bottom of heat exchanger 54 and a heated second fluid outlet 68 is disposed at the top of the heat exchanger.

According to a preferred embodiment of the present invention, the inner diameter of tubes 58 is one-half inch. Each of the tubes 58 has an overall length of 20 meters. The width of each of plates 60 is 6 cm. Reservoir 52 typically has a capacity of 120 liters of first fluid less the volume of the heat exchanger which is about 7 liters.

It is a particular feature of the present invention that the water heating apparatus is designed to maximize the days of the year at which acceptably hot water is attained in the morning without requiring auxiliary heating as by electricity. This maximization is carried out as follows:

The efficiency of the collector and the storage and heat transfer losses are calculated for given levels of incident solar radiation, typically corresponding to given months of the year. These quantities, which are both expressed as efficiencies are plotted as a function of the storage volume of the reservior and the overall efficiency of the system is also plotted as a function of the storage volume. The storage volume corresponding to maximum efficiency is chosen for the reservoir. A sample plot of collector and storage efficiencies as well as total system efficiencies is provided in FIG. 8, which is plotted for the month of March in Israel for a first fluid flow of 10 grams/second and a collector area of 2 sq. meters. In considering the storage efficiency, it is noted that water outputs at less than 40 degrees centigrade are ignored.

Since the storage volume is normally not variable, the storage volume is selecsted to correspond to peak overall efficiency for the marginal months when the incident solar radiation is marginally sufficient to provide desired water heating. Alternatively, the storage volume may be made variable over different seasons as by varying the height of the first fluid in reservoir 52, or by introducing a liquid displacing object in the reservoir.

In operation, the first fluid is circulated through the solar collector array 44 for being heated thereby to approximately 95 degrees centrigrade maximum. This heated water is stored in reservoir 52. Water to be heated, typically connected to a pressurized hot water supply system of a dwelling or any other suitable utilization apparatus, is circulated through heat exchanger 54 in heat exchange contact with the first fluid 28 through heat exchanger 54. Circulation of the heated water may be provided by pressurization of a cold water source from any suitable source, such as a municipal water system.

It is a particular feature of the present invention that no storage of heated water is contemplated, the accumulated solar energy derived heat being stored instead in the heat exchange fluid. Accordingly, the arrangement of the heat exchanger 54 is calculated in order to provide sufficient heat exchange between the first fluid and the water to be heated so as to provide heating of the water to a desired temperature.

It is a further feature of the present invention that the circulatory system of the first fluid, including the solar concentrator array 44 and the reservoir 52 are maintained substantially at atmospheric pressure. It is appreciated, of course, that pump 22 increases this pressure somewhat in order to produce circulation, however, it is seen that the system is maintained substantially at atmospheric pressure.

It will be appreciated by persons skilled in the art that the present invention is not limited to what has been particularly shown and described hereinabove. Rather, the scope of the present invention is defined only by the claims which follow:

I claim:

1. Solar water heating apparatus comprising:
   a housing;
   means disposed in the housing for receiving incident solar energy and for heating a first fluid thereby and comprising a non-focusing solar energy concentrator comprising:
   a solar energy absorbing plate defining first and second parallel back-to-back solar energy absorbing surfaces;
   solar energy transmissive material disposed adjacent said first and second parallel absorbing surfaces, said solar energy transmissive material defining first and second incident surfaces and also defining first and second reflecting surfaces operative to reflect radiation incident at said first and second incident surfaces and having an index of refraction and a configuration selected to provide total internal reflection at said first and second incident surfaces of radiation incident on said incident surfaces within a predetermined angular range of incident radiation relative to said first and second absorbing surfaces;
   heat exchanger means disposed in said housing for contacting said heated first fluid and being operative to heat a second fluid; and
   means for providing circulation of said first fluid through said receiving and heating means and in thermal contact with said heat exchanger means, and
   wherein said first fluid is maintained at atmospheric pressure.

2. A solar water heater according to claim 1 and wherein said heat exchanger means is disposed in a reservoir containing said first liquid.

3. Apparatus according to claim 1 and wherein said housing is integrally formed of an insulating material such as a foamed plastic.

4. Apparatus according to claim 1 and wherein said heat exchange means comprises a zig-zag arrangement of welded thermally conductive tubes and fins through which passes a pressurized flow of said second fluid.

5. Apparatus according to claim 4 and wherein conduit means are provided for directly supplying the output of said heat exchange means to a utilization location without intermediate storage.

6. Solar water heating apparatus according to claim 1 and wherein:
   said first and second parallel back-to-back solar energy absorbing surfaces comprise surfaces having low emissivity characteristics and arranged in communication with fluid flowing adjacent thereto for heat transfer to said fluid;
   said first and second incident surfaces are disposed on opposite sides of said solar energy absorbing plate and arranged to receive incident radiation from the sun, each of said first and second incident surfaces having a surface area which is greater than the surface area of each of said first and second solar energy absorbing surfaces, the solar energy transmissive material also defining first and second adjacent surfaces disposed in spaced adjacent relationship to said first and second parallel absorbing surfaces for transmitting radiation thereto, the separations between said first and second adjacent surfaces and said first and second absorbing surfaces defining a channel for passage of fluid therebetween;

said first and second incident surfaces lying perpendicular to said first and second absorbing surfaces;

and wherein said plate is surrounded externally along said absorbing surfaces by said transmissive material, thus providing thermal insulation for said plate.

7. Solar heating apparatus according to claim 6, said solar energy concentrator further comprising reflector means associated with a surface of said transmissive material for directing radiation towards said absorbing surface.

8. Solar heating apparatus according to claim 6 and wherein said heat exchanger means is disposed in a reservoir containing said first liquid.

9. Solar heating apparatus according to claim 6 and wherein said heat exchanger means comprises a zig-zag series arrangement of a tube and plate assembly comprising a plurality of thermally conductive tubes welded to heat exchange plates and through which passes a pressurized flow of said second fluid.

10. Solar heating apparatus according to claim 1 and wherein said heat exchange means comprises a zig-zag series arrangement of a tube and plate assembly comprising a plurality of thermally conductive tubes welded to heat exchange plates and through which passes a pressurized flow of said second fluid.

* * * * *